2 Sheets-Sheet 1.

Whitely, Fassler, & Kelly.

Cider Mill.

No. 2,499. Reissued Feb. 26, 1867

Witnesses.

R. D. O. Smith
Andrew Hately.

Inventors.

Wm. N. Whiteley
Jerome Fassler
Oliver S. Kelly
By their Atty. T. Dennis Jr.

AM. PHOTO-LITHO. CO. N.Y. (OSBORNE'S PROCESS)

2 Sheets-Sheet 2.

Whitely Fassler & Kelly,

Cider Mill.

No. 2,499. Reissued Feb. 26, 1867.

Witnesses.

R. D. C. Smith
Andrew Whiteley

Inventors.

Wm. N. Whiteley
Jerome Fassler
Oliver S. Kelly
By their Atty. T. Dennis Jr.

AM. PHOTO-LITHO. CO. N.Y. (OSBORNE'S PROCESS)

United States Patent Office.

WILLIAM N. WHITELEY, JEROME FASSLER, AND OLIVER S. KELLY, OF SPRINGFIELD, OHIO.

*Letters Patent No.* 40,987, *dated December* 15, 1863; *reissue No.* 2,499, *dated February* 26, 1867.

IMPROVEMENT IN CIDER-MILLS.

The Schedule referred to in these Letters Patent and making part of the same.

TO ALL WHOM IT MAY CONCERN:

Be it known that we, WILLIAM N. WHITELEY, JEROME FASSLER, and O. S. KELLY, of Springfield, in the county of Clark, and State of Ohio, have invented a new and useful Improvement in Mills for Grinding Fruit, Vegetables, Grain, &c., and pressing the juice therefrom; and we do hereby declare the following to be a full, clear, and exact description of the same, reference being had to the accompanying drawings, in which—

Our invention relates to that class of grinding and pressing machines which are termed "portable" and "combined," because they are made in such form and proportions as to render them easy of transportation without separation of parts, and because the grinding mechanism is connected to the pressing mechanism so that the two are united in one machine. The elements of our invention, as secured by this patent, are, first, the relative positions of the grinding rollers and crushing roller and segments, which form parts of the grinding box, whereby the crushing roller crushes the fruit against a rough-faced metal plate and then delivers it between the grinding rollers, which are placed beneath the crushing roller, and between which it is passed; second, in arranging the crushing roller in relation to the breast-plate, against which the fruit is crushed, so that the intervening space shall be wide at top and narrow at bottom to admit the fruit with ease; third, in making one of the segments which form the ends of the box in such form as will enable it to act as a stationary scraper to remove the fruit from the crushing roller; fourth, in placing the gearing entirely outside of the frame and journal boxes; fifth, in making the grinding rollers with ribs, which cross each other at an angle, and revolving these rollers at different velocities; sixth, in making and connecting the grinding box so that it may readily be removed from the grinding frame for the purpose of cleansing or repairing the same.

That others may understand the construction and operation of our machine, we will more particularly describe it.

Figure 1:
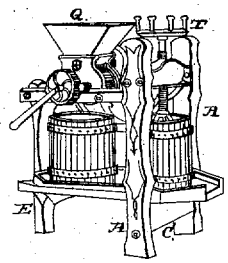
Figure 1 is a perspective view of our combined mill and press.
Figure 3:
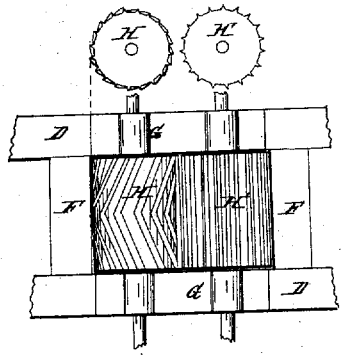
Figures 3 and 4 represent different forms of grinding rollers.
Figure 4:
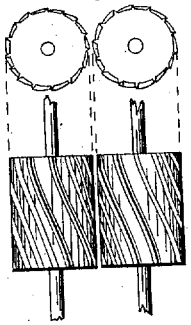
Figure 5:
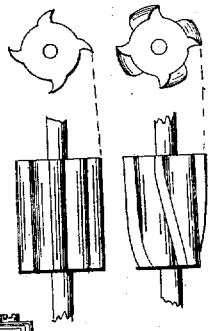
Figure 5 shows two forms of the crushing roller.
Figure 2:
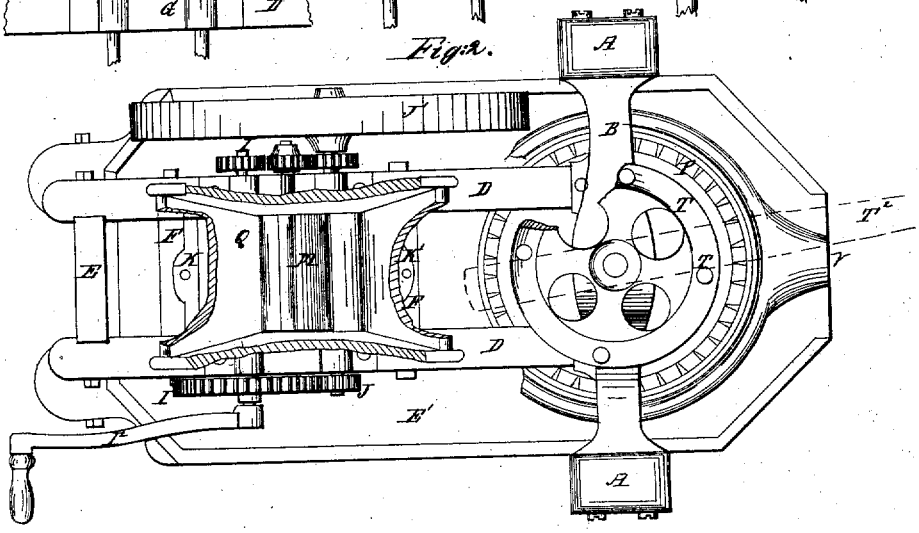
Figure 2 is a top plan view of the same.
Figure 6:
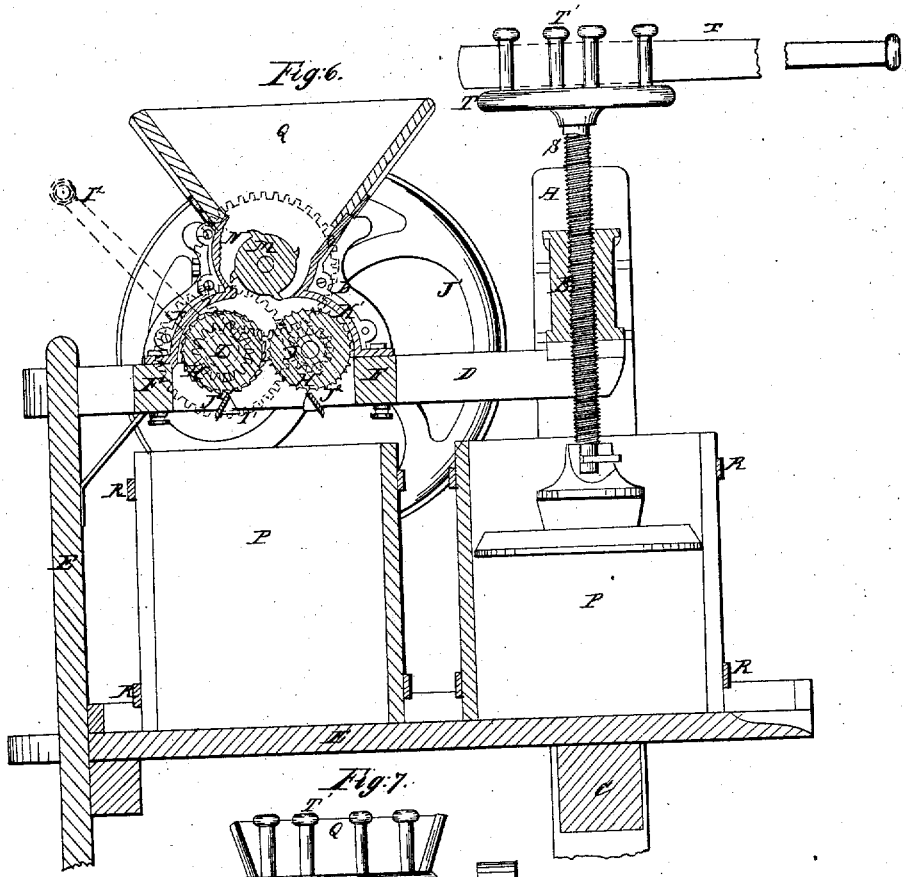
Figure 6 is a vertical longitudinal section of the mill.
Figure 7:
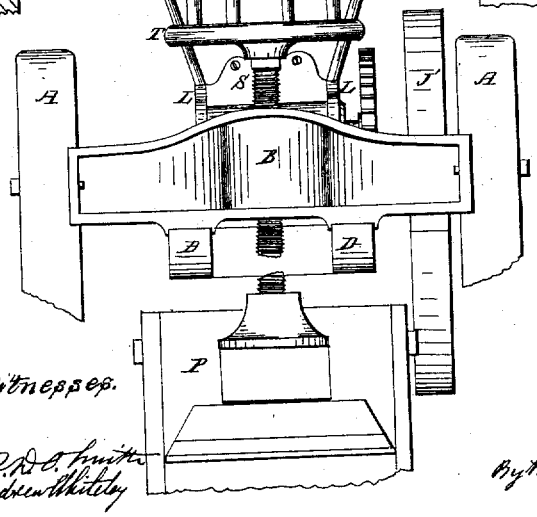
Figure 7 is an elevation of the upper portion of the front of the press.

A A are the posts at the front of the machine. They are connected by the press-beam B above and by the girder C below, the whole constituting the press frame. At the rear end of the machine is the single post E, connected to the press frame by the platform E′ below and by the rails D D above. These latter, with the cross-bars F F, form the frame of the grinding machine, and are termed the grinding frame. The journals of the two grinding rollers, H H′, are mounted in the boxes G G, which are secured upon the rails D D at suitable points. The surfaces of the grinding rollers H H′ are fluted or ribbed, and these ribs may be in various forms, as shown; that is, the ribs on one roller may be straight and parallel with the axis, while those upon the other are spiral half the length of the roller in one direction, and during the remaining half in the opposite direction, as shown in fig. 3; or the ribs upon the two rollers may be spiral throughout the length of the rollers, and when the rollers are in position the ribs may cross each other in opposite directions, as shown in fig. 4, or the methods of fluting mentioned may be combined in any other manner upon the two rollers. The crushing roller M is also provided with ribs on its surface, but they are much larger and are less numerous than the ribs upon the surface of the grinding rollers H H′. They may be parallel with the axis or spiral, as shown in fig. 5. The crushing roller M has its journal bearings in suitable boxes secured to the side boards L, which form portions of the grinding box, and its velocity of revolution is about one-third that of the grinding rollers. Its office is to roughly crush the fruit against a breast-plate near to which it runs, and then to feed the crushed fruit to the grinding rollers, by which it is reduced to fine pulp and dropped into the cheese-hoop P, which stands beneath upon the platform E′. The side boards L L of the crushing and grinding box are connected by and secured to the metallic segments K K′, which form the ends of said box. The segments K K′ stand upon the cross-bars F F, and are secured thereto by small edges or projections, which fit just within the inner edges of said cross-bars, and by two bolts which pass through the cross-bars F and through feet or flanges projecting from the lower edges of the segments so as to rest upon the upper surfaces of said cross-bars. These features are clearly shown in fig. 6. From the cross-bars F the segments rise and curve inwardly toward each other, the curvature being such as will conform to the surfaces of the rollers H H′, leaving sufficient space between them to avoid danger of clogging. When they have slightly passed lines perpendicular to the axes of the grinding rollers they cease to approach and turn sharply backward, curving upward again so as to form a concave chamber, in the lower part of which is placed the crushing roller M. The hopper Q rests upon and is united to the upper edges of the segments K K′ by screws, as shown in fig. 7. The side boards L are secured to the segments by screws, which pass through flanges turned along their edges, as clearly seen in fig. 6. The crushing roller M is located directly above the space between the two grinding rollers, and the edge Y of the segment K′ approaches very near to it, so that said edge acts as a stationary scraper to remove such of the fruit as may cling to the points of the crushing ribs and compel it to fall upon the grinding rollers. This is of much importance, as without being removed so much would finally cling to these ribs as to seriously impair their operation. The upper portion of the segment K is curved so as to approach quite nearly to the roller M at the point where it turns backward, and from thence to its upper edge the distance from the crushing roller rapidly increases. Its inner surface, at N, is roughened so that as the fruit falls from the hopper into the space between N and the roller M it will be certainly caught by the ribs upon said roller and crushed against this rough surface. By removing the bolts which secure the segments K K′ to the cross-bars F, the hopper, grinding box, and crushing roller may be lifted off the grinding frame, so that the grinding rollers are left entirely exposed for cleaning or repair and the interior of the lower portion of the grinding box is equally accessible for the same purposes.

The shafts of the several rollers above mentioned extend beyond their journal boxes, and the connecting gearing is placed entirely outside of said boxes and the grinding frame. The gearing mentioned above is so proportioned that the three rollers have imparted to them three different velocities, as follows: Upon one end of the shaft I of the roller H is the crank $I^2$ and the driving-gear $I^1$. The crank is to be used when the machine is to be driven by hand. Upon the other end of the shaft I is a much smaller gear-wheel or pinion. The driving-gear $I^1$ drives the roller H′ by the pinion J, so that H′ moves much faster than H, which only has the motion of the crank $I^2$. The shaft of the roller H′ carries at its end opposite to its driving-pinion the balance-wheel $J^1$. The small gear upon the end of the shaft I matches with the teeth of a larger wheel upon the shaft of the crushing roller, so that this roller moves with less velocity than either of the others. The face of the fly-wheel $J^1$ is made broad and flat, so that a belt may be used thereon by which the mill may be driven by power, if required. By this arrangement the gearing and balance-wheel are removed from the frame and to one side, so as to leave the space above the platform and between the grinding and pressing mechanism entirely clear and unobstructed, so that when one cheese-hoop is filled it may be removed along the platform from beneath the grinding rollers to its proper position within the pressing frame. Beneath the rollers H and H′ are the scrapers $J^2$ $J^2$ to remove the pomace which might otherwise cling to the ribs of those rollers. These scrapers are rigidly attached to the rails D D. The cheese-hoop P is made with stout staves set a little distance from each other and secured to the inner sides of two stout bands, R R. The edges of these staves are so bevelled as to leave the spaces between them a little wider at the outer than at the inner side. The platform E′, which extends from the rear post E to the front of the mill, is provided with a raised edge, and in front with a channel and spout, V, to convey into a proper receptacle the juice expressed from the pomace. The screw S passes down through the beam B, which is provided with a proper female screw for its reception. At its lower end is a metal collar, which is secured by a key or screw entering a channel cut in the end of the screw-rod, so that said rod may turn freely in the collar but need not be detached therefrom. At the top of the screw is the hand-wheel T, with the pins $T^1$ projecting from its upper side. These pins may be seized by the hands in turning the screw, but they are particularly designed to accommodate the lever $T^2$ when the screw is to be forced down with power. The fruit to be ground is placed in the hopper Q. As motion is communicated to the rollers H H′ and M, the latter crushes against the serrated breast N all such of the fruit as has fallen into the space between said rollers and breast, carrying the same down and dropping it between or upon the grinding rollers H H′. The scraping edge Y prevents the passage up into the hopper again of any considerable portion of this crushed fruit. When one rib of the crushing roller has seized and carried down a portion of the fruit the pressure of that which remains in the hopper forces another portion into the space between M and N, and this in turn is seized by the next succeeding rib of the crusher, and so on until all is consumed. The rough face of N, in conjunction with the ribs of the crushing roller M, at once seizes and holds large and hard fruit which would otherwise sometimes spring out and render the grinding mechanism in effect inoperative. This result can never follow if the ribs of the crusher are constructed in the hooking form shown in figs. 5 and 6. As the crushed fruit falls upon the grinding rollers it is caught by the ribs thereon and carried between them. Here it is not simply crushed or squeezed, but by the greater rapidity of the motion of one than the other it is torn and ground to bits without being so thoroughly deprived of its juice as would be the case did the two rollers move at equal velocities. From the grinding rollers the pomace falls into the cheese-hoop, which stands upon the platform E′ directly beneath, and when one hoop is filled in this way it is removed by sliding it along the platform and placed beneath the screws, and another hoop may then be placed beneath the rollers. In this way the operations of grinding and pressing may go on simultaneously.

Having described our invention, what we claim as new, and desire to secure by Letters Patent, is—

1. A mill for grinding fruit, when constructed with two grinding rollers H H′ placed beneath a crushing and feeding roller M, which crushes the fruit against a serrated breast-plate and then feeds the same to the grinding rollers, by which it is reduced to pulp, substantially as described.

2. The rollers H H′, M, in combination with the metal segments K K′, constructed as described, and one of them provided with the scraping edge Y, substantially as and for the purpose set forth.

3. We claim the spiral ribbed grinding rollers running together at different velocities, with the ribs of one roller crossing the ribs of the other at an angle where the grinding is effected, in combination with the crushing and feeding roller arranged above them.

4. We claim the hopper Q, serrated breast-piece or ribbed segment N, segments K K′, and sides L L, with the roller M, forming the crushing box, constructed so as to be readily removed from the grinding rollers and grinding frame, as described, for cleaning or repairing the mill.

5. We claim the combination of the crushing roller M, breast-plate N, stationary scraper Y, grinding rollers H H′, and scrapers $J^2$ $J^3$, when constructed and arranged for joint operation, substantially as shown and described.

WM. H. WHITELEY,
JEROME FASSLER,
O. S. KELLY.

Witnesses:
GEO. W. BENNS,
T. J. PRINGLE.